United States Patent
Apple

[19]

[11] Patent Number: 5,337,989
[45] Date of Patent: Aug. 16, 1994

[54] TWO-PIECE SELF-LOCKING POLE STAND ASSEMBLY

[76] Inventor: Phillip C. Apple, R.D. 1, Box 65, Mt. Pleasant Mills, Pa. 17853

[21] Appl. No.: 844,198

[22] Filed: Mar. 2, 1993

[51] Int. Cl.⁵ .............................................. E02D 5/74
[52] U.S. Cl. ..................................... 248/519; 52/165; 248/523; 248/530; 248/222.1; 403/315; 403/375
[58] Field of Search ............... 248/558, 519, 523, 529, 248/530, 533, 156, 159, 165, 222.1; 52/165, 166; 403/321, 375, 315, 319, 326

[56] References Cited

U.S. PATENT DOCUMENTS

| | | | |
|---|---|---|---|
| 897,417 | 9/1908 | Self | 52/166 |
| 2,396,747 | 3/1946 | Parrott | 403/353 |
| 2,628,797 | 2/1953 | Campomar | 248/156 X |
| 4,649,678 | 3/1987 | Lamson | 248/530 X |
| 4,832,304 | 5/1989 | Morgulis | 248/530 X |
| 4,896,651 | 1/1990 | Kott, Jr. | 248/156 X |
| 5,090,165 | 2/1992 | Kenny | 52/165 |

*Primary Examiner*—David A. Scherbel
*Assistant Examiner*—Derek J. Berger

[57] ABSTRACT

A two-piece self-locking pole stand assembly includes a sleeve base that is secured into the ground and a tubular insert that fits snugly into the base, housing two pivot arms that engage the base and automatically lock the insert to it upon insertion of the pole.

2 Claims, 5 Drawing Sheets

TWO-PIECE SELF-LOCKING POLE STAND ASSEMBLY

FIELD OF THE INVENTION

This invention relates in general to the support of large vertical poles, and in particular to the support of poles that are set up and brought down frequently.

BRIEF DESCRIPTION OF PRIOR ART

A large vertical pole is most often supported by inserting it into a cylindrical tube that is either rigidly attached to a heavy flat base plate or inserted into a permanently installed sleeve that functions as a base set into the ground. The cylindrical tubing should be of sufficient length to ensure vertical positioning of the pole while the base plate or sleeve base must provide adequate anchoring to the ground. The two components of the stand should also attach to one another in a fashion that eliminates any risks involved with unwarranted disconnection of the assembly in the form of either weather influences or tampering.

A pole stand design that incorporates a cylindrical tube attached to a base plate relies on the overall weight of the stand to sufficiently anchor the pole to the ground. Any intention of relocating this stand is jeopardized by the anchoring weight. This design also leaves the entire length of the cylindrical tube exposed above ground level, detracting from any aesthetic quality of the pole and generating a potential health hazard when the pole is removed and the stand left unguarded.

A pole stand design consisting of a cylindrical tube inserted into a permanent in-ground sleeve reduces the overall weight of the device by utilizing the ground around it to anchor the pole. The cylindrical tube may be threaded and screwed down into the sleeve to reduce any risks of unwarranted disconnection when supporting a large pole. It may be removed when the pole is not in operation. The exposed length of the tube is also reduced because it fits into the sleeve and extends from below ground level up a length of the pole. Adversely, any rotation of the pole and/or tube may loosen or even disconnect the tube from the sleeve while the pole is still intact. Coupled with the assembly task of screwing the robe into and out of the in-ground sleeve, these factors detract from a sound pole stand design.

SUMMARY OF THE INVENTION

The primary objective ;of the present invention is to eliminate the risks involved with unwarranted disconnection of a two-piece pole stand assembly while the pole is intact and reduce the time and effort necessary to fasten a pole stand tube into an in-ground sleeve by designing a tubular insert that automatically locks into its in-ground sleeve upon insertion of the pole. The sleeve base consists of a cylindrical tube fixed to a small flat at one end and a cylindrical collar of greater diameter and thickness than the tube attached to the other end, a length of which is bored out establishing a groove on the inside between the top edge of the tube and the collar. The sleeve is secured into the ground with its top edge flush with the ground surface. The stand insert consists of a cylindrical tube having an outside diameter that allows for a sliding fit between the tube insert and sleeve, a collar fixed along the length of the tube on its outside that acts as a stop between the two mating members, and a self-locking device incorporated into the collar. The self-locking device consists of two pivot arms with heels of thickness slightly less than that of the sleeve's groove that swing outward and latch into the base groove when the tubular stand is inserted into the sleeve base and the pole is inserted into the stand.

Because the pivot arms automatically lock the tubular stand into the sleeve base upon insertion of the pole, there is no risk of the two members separating until the pole is removed. In addition, assembly time is reduced because the tubular stand need only be inserted into the sleeve base before the pole is inserted.

Other objects and features of the present invention will become apparent as the description proceeds. A more detailed explanation of the invention is provided in the following embodiment and accompanying drawings.

DESCRIPTION OF THE PREFERRED EMBODIMENT

Figure 1:
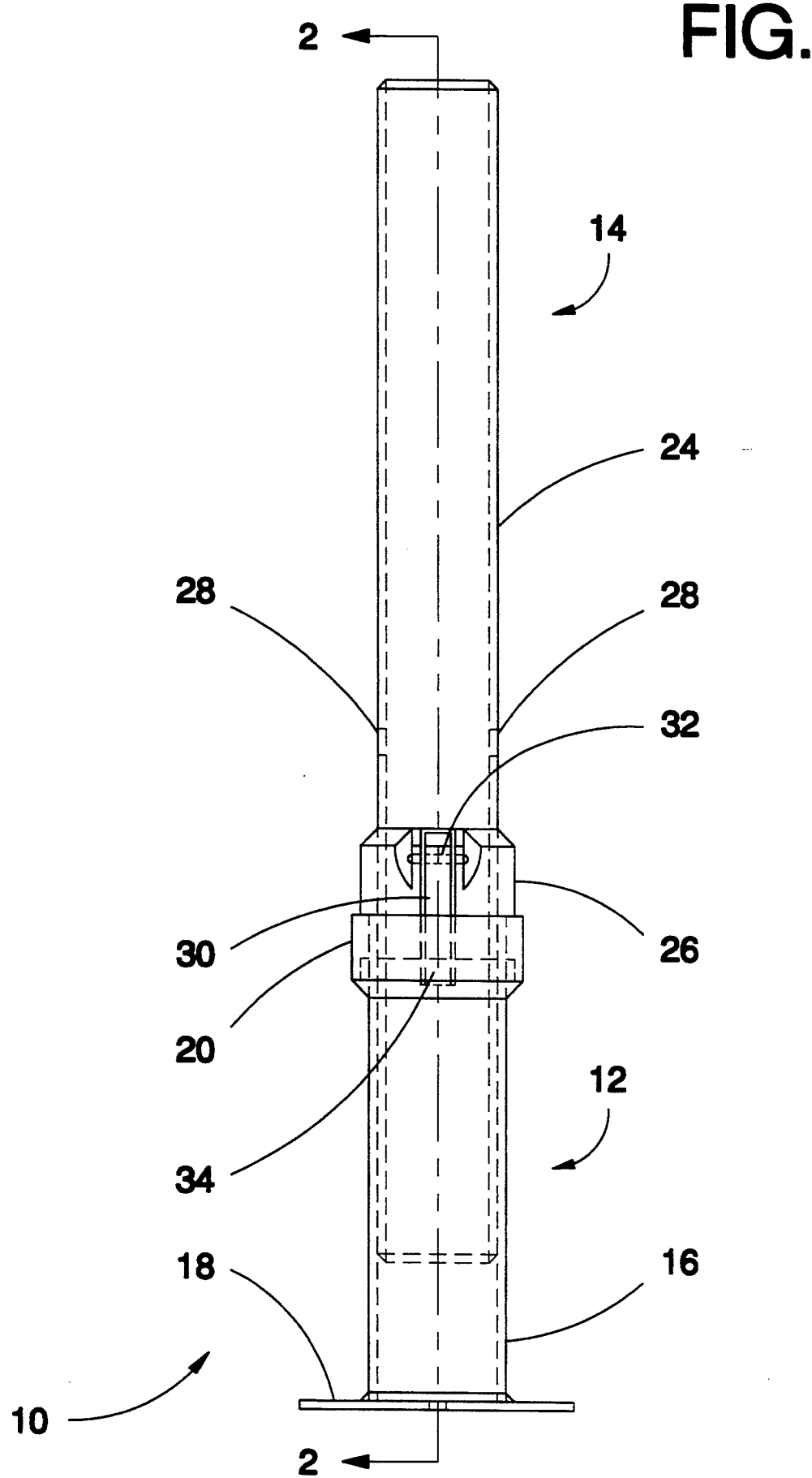
FIG. 1 is a front view of the assembled pole stand insert and sleeve base.
Figure 2:
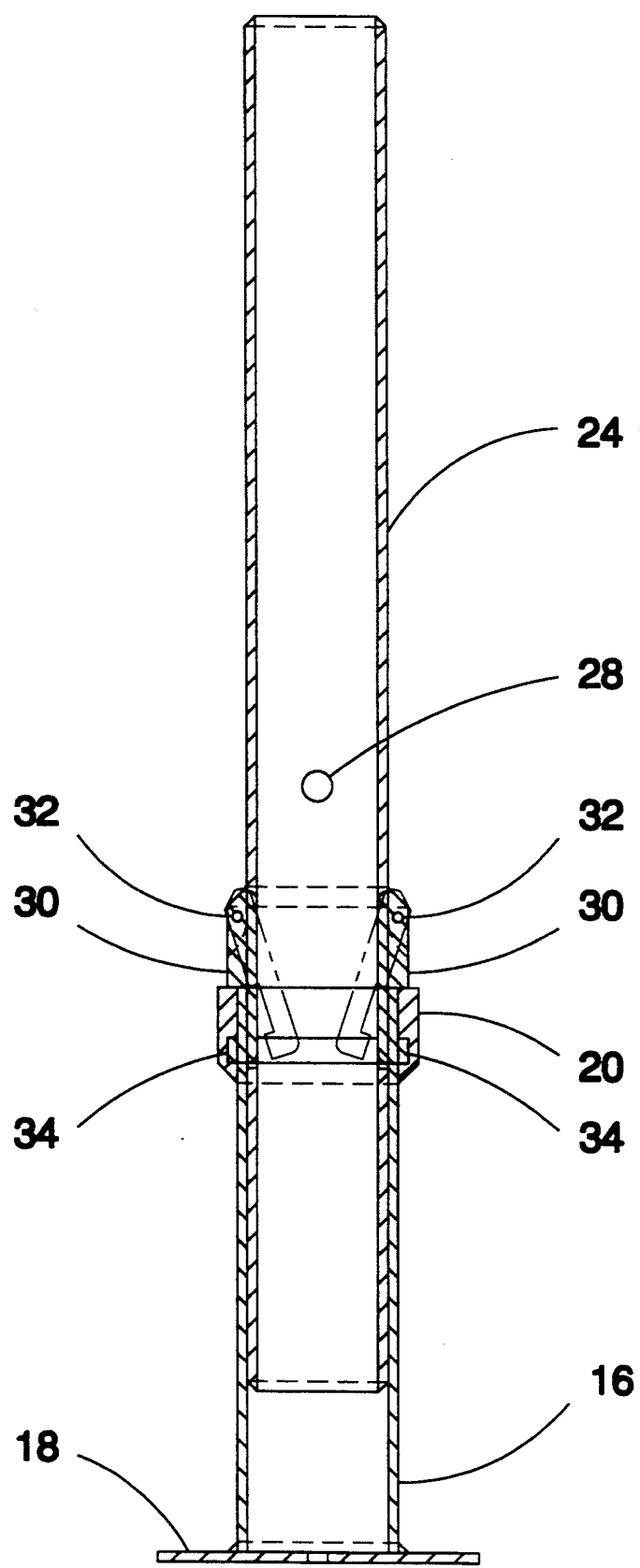
FIG. 2 is a sectional view of the assembled pole stand insert and sleeve base taken along line 2—2 of FIG. 1.
Figure 3B:
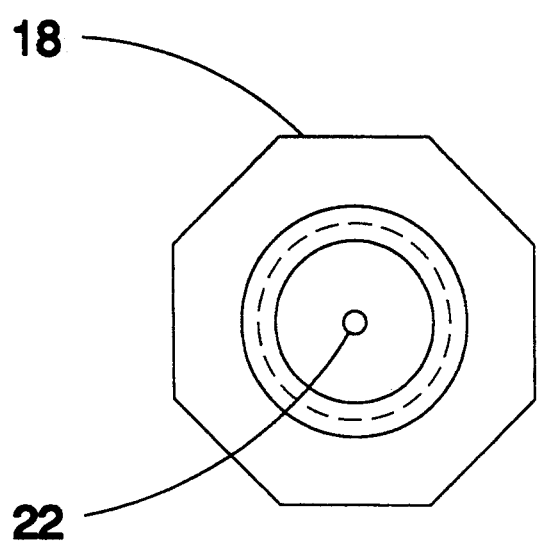
FIG. 3A and B are front and top views of the sleeve base.
Figure 3A:
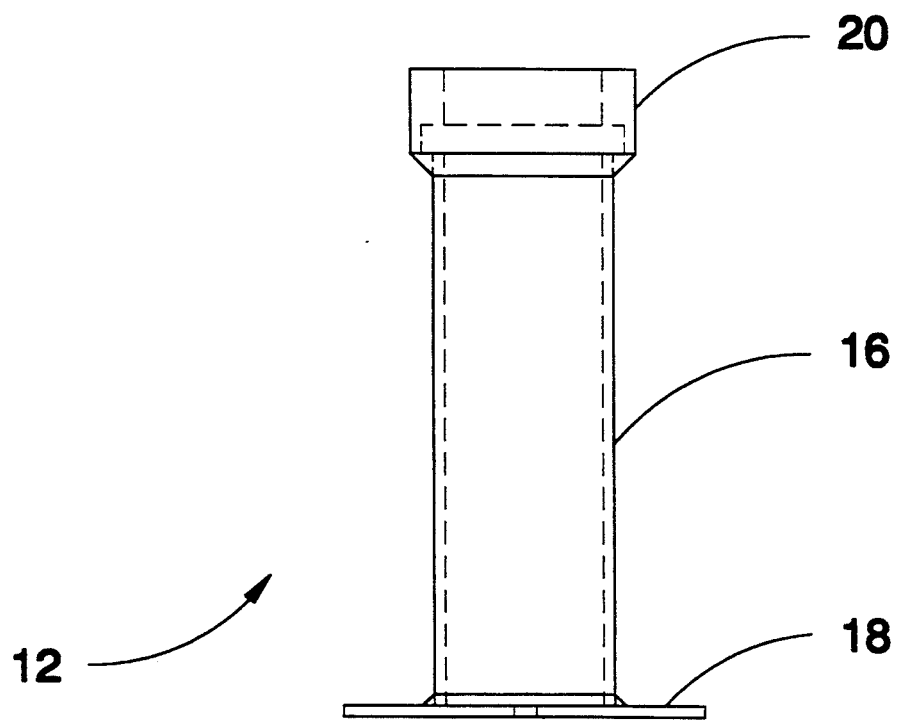
Figure 4:
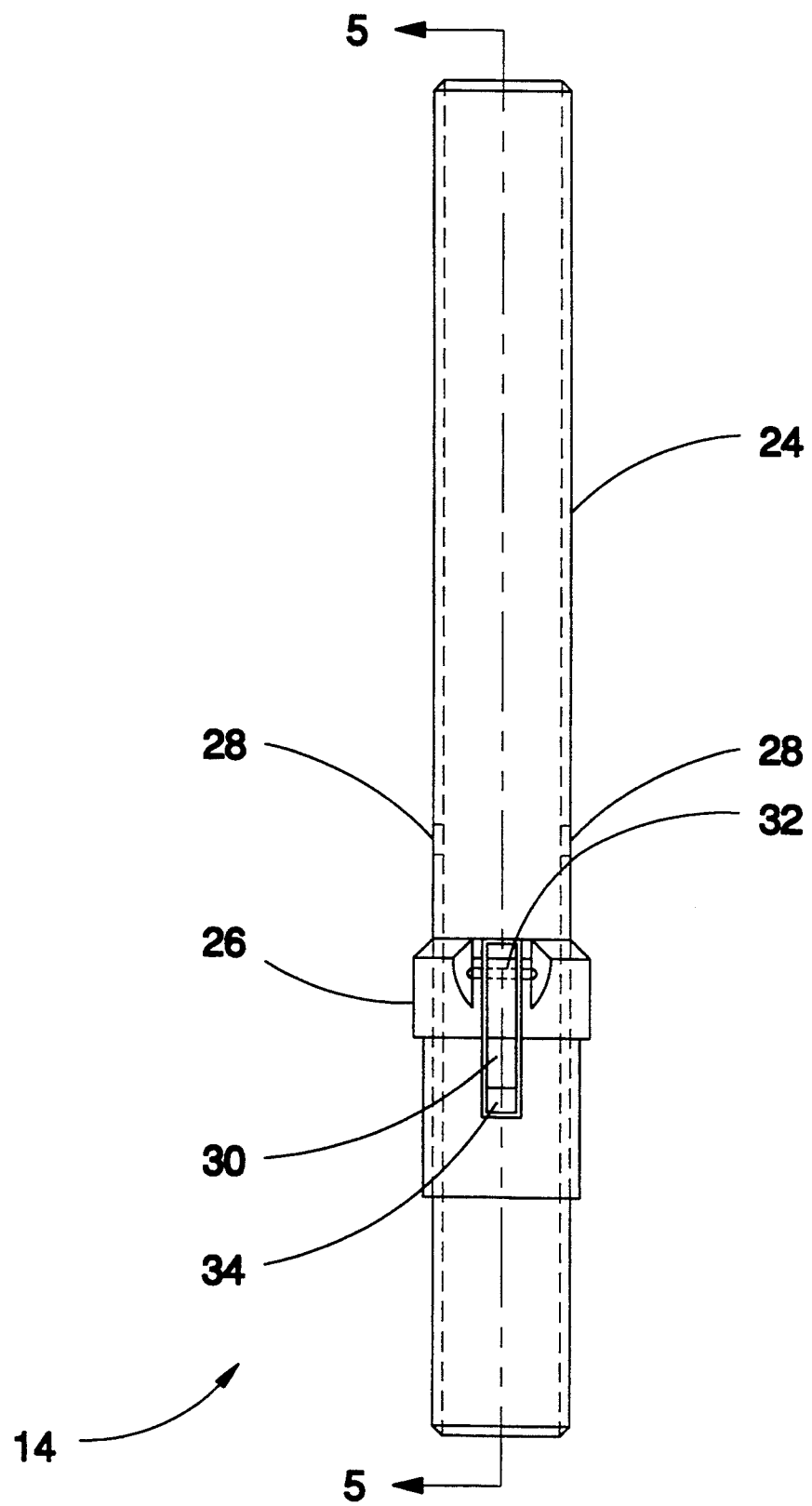
FIG. 4 is a front view of the pole stand insert.
Figure 5:
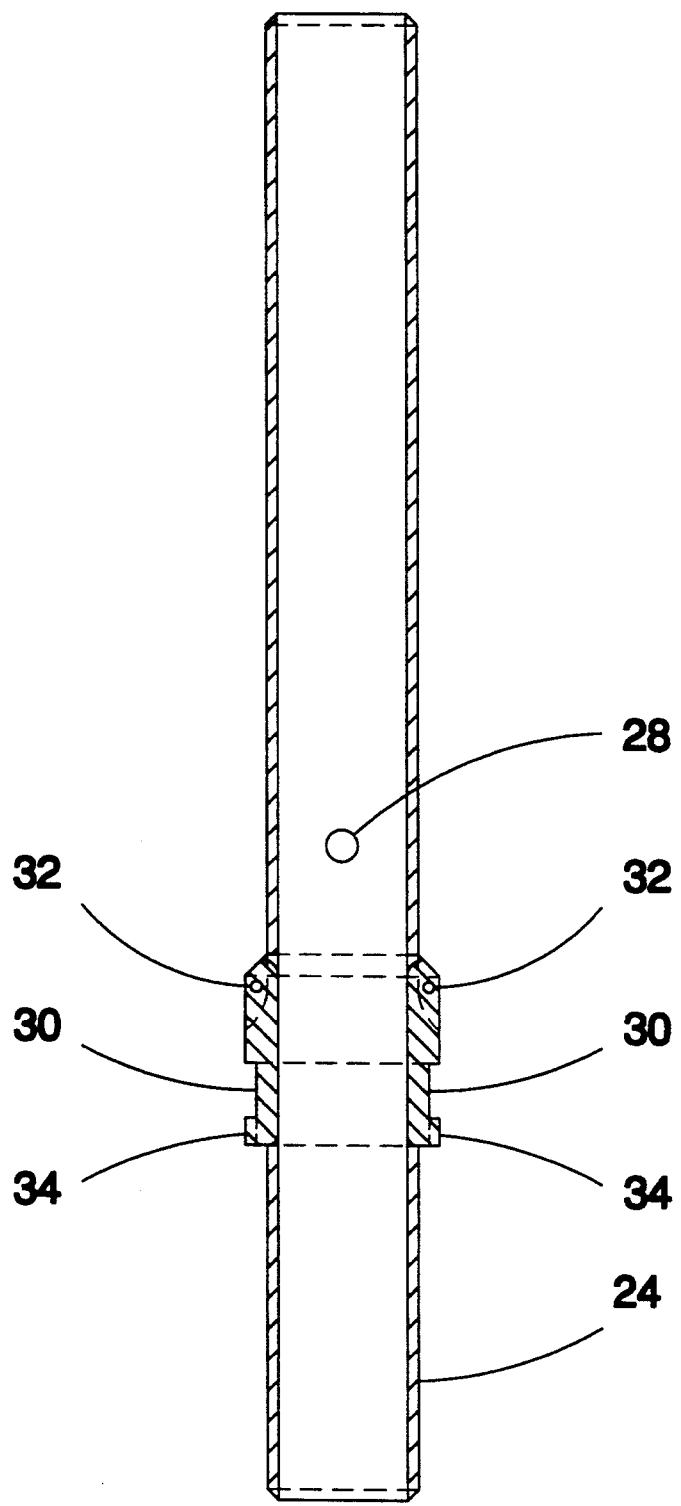
FIG. 5 is a sectional view of the pole stand insert taken along line 5—5 of FIG. 4.

Pole stand assembly 10 includes a permanently set in-ground sleeve 12 that serves as a base and a detachable tubular insert 14 that provides vertical support for the pole. Sleeve 12 consists of a cylindrical stainless steel tube 16 welded to both a stainless steel flat 18 at one end and a cylindrical stainless steel collar 20 at the other end. A small length of collar 20 is bored out, prior to sleeve assembly and on its inner surface, establishing a small cylindrical groove above the top edge of tube 16. Hole 22 is drilled through flat 18 to allow for proper drainage. Tubular insert 14 consists of a cylindrical stainless steel tube 24 with an outside surface diameter that is slightly smaller than the inside diameter of tubing 16 which allows for a sliding fit into sleeve 12, a cylindrical stainless steel collar 26 welded to tube 24 on its outside surface that, upon assembly of sleeve 12 and insert acts as a stop by entering sleeve collar 20 and resting on its top edge, and a stainless steel locking device housed in slots cut out of collar 26. Two diametrically opposed holes 28 are drilled through tube 24 above collar 26 for fastening the pole to the assembly. The locking device includes two pivot arms 30 that pivotally connected to pins 32 embedded in collar 26. Pivot arms 30 are shaped to include heels 34 of thickness slightly less than that of the sleeve collar groove and other, vise assume the surface contour of collar 26 on their outside edges. Pivot arms 30 are free to rotate about pins 32 from their initial and disengaged position, depicted in FIG. 2 with broken lines, to their final and engaged position, also depicted in FIG. 2. By lowering the tubular insert into the sleeve collar and inserting the pole into the assembly, the two pivot arms engage the base groove and lock the insert to the sleeve. Only after the pole is removed may the insert be removed from the sleeve.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim as my invention is:

1. A cylindrical two-piece pole stand assembly that automatically locks together upon insertion of a pole comprising:

- a permanently set in-ground sleeve comprised of a length of tubing with a top end and a bottom end;
- a flat welded to the bottom end of said sleeve, the center of said flat being drilled out to allow for drainage;
- a sleeve collar welded to the top end of said sleeve, said sleeve collar including a top edge and an inner surface with a cylindrical groove therein;
- a tubular insert comprised of a length of tubing with an outside surface with a diameter that allows for a sliding fit into the sleeve;
- an insert collar welded to the insert tubing on its outside surface which, upon assembly of said sleeve and insert acts as a stop between the sleeve and insert by entering the sleeve collar and resting on its top edge;
- two diametrically opposed holes drilled through the insert tubing above the insert collar for fastening said pole to the pole stand;
- said insert collar further comprising two slots in its outer surface, each said slot further including a pin extending across said slot and a pivot arm pivotally mounted to said pin;
- said pivot arms further comprising outwardly extending heels of thickness slightly less than that of the sleeve collar groove, whereby upon assembly of said sleeve and insert the heels may slide into said groove for automatically locking the tubular insert to the sleeve base when the tubular insert is lowered into the sleeve base and said pole inserted into the assembly.

2. A pole stand as in claim 1 wherein said tubular insert is removable from said in-ground sleeve base only after said pole is removed from the assembly.

* * * * *